U. M. SUNDERLAND.
Land-Roller.
No. 40,961.
Patented Dec. 15, 1863.
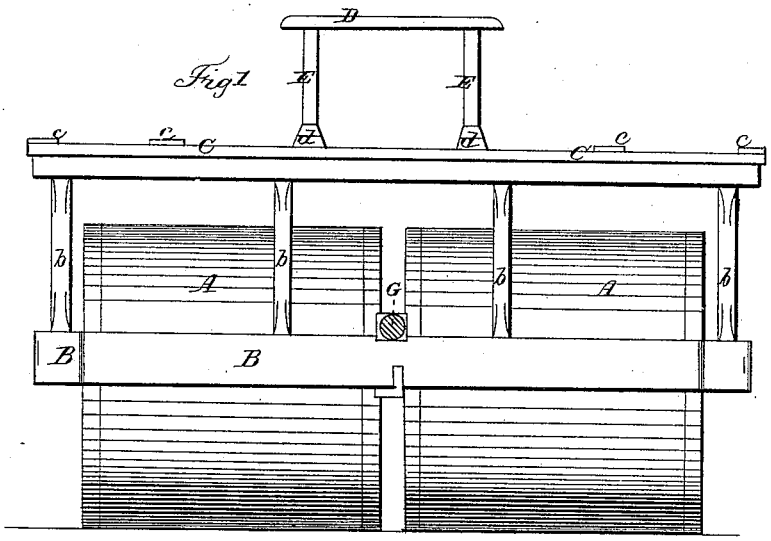
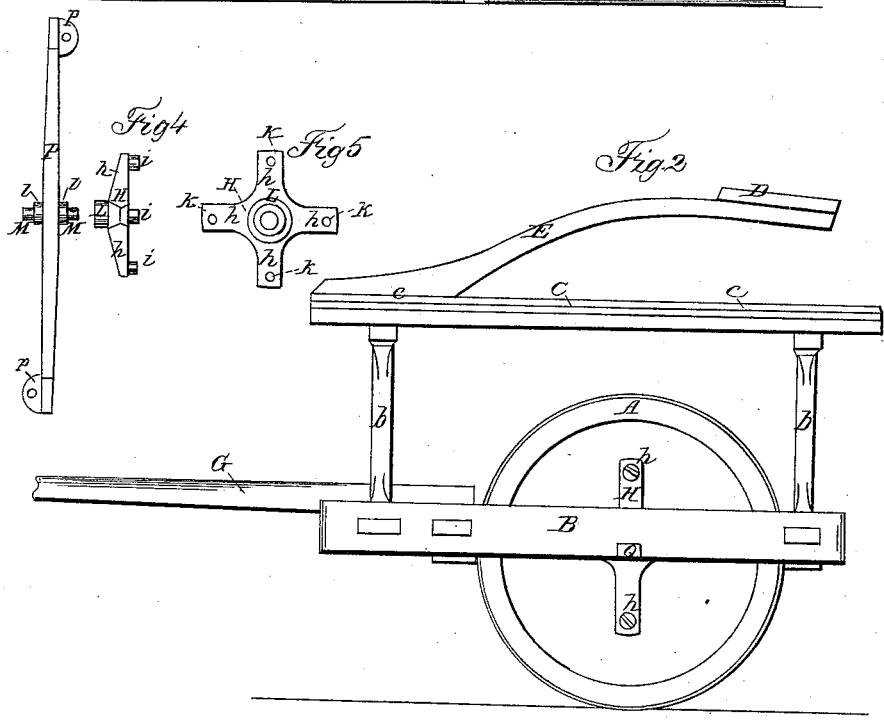

UNITED STATES PATENT OFFICE.

U. M. SUNDERLAND, OF HIGHGATE, VERMONT.

IMPROVEMENT IN FIELD-ROLLERS.

Specification forming part of Letters Patent No. 40,961, dated December 15, 1863.

*To all whom it may concern:*

Be it known that I, U. M. SUNDERLAND, of Highgate, in the county of Franklin and State of Vermont, have invented a new and Improved Field-Roller; and I do hereby declare that the following is a full and exact description thereof, reference being had to the accompanying drawings, making part of this specification.

Figure 1 is a front elevation of my roller; Fig. 2, a side elevation. Figs. 3, 4, and 5 are views of parts detached.

I employ two rollers, A A, situated end to end, close or near together, their axes being on the same line. These are mounted on a suitable frame, B, from which standards $b$ $b$, or their equivalents, extend upward and support a housing, C, to protect the rollers from the weather. This housing may consist of a close covering of thin boards, their joints being covered with battens $c$ $c$ $d$ $d$. The two middle battens, $d$ $d$, are made thick and strong enough to support a driver's seat, D, which rests on two long wooden springs, E E, firmly bolted or otherwise secured to the battens, the whole arrangement being substantially as shown in the drawings.

The rollers A A are hollow cylinders made of staves, and provided with heads to which the bearing-boxes H H are secured.

The bearing-boxes have four (more or less) arms, $h$ $h$, each provided with a lug-projection, $i$, Fig. 4, on the under side, near the extremity thereof. These lugs enter holes in the head of the cylinder made to receive them, and they are perforated with holes $k$ $k$, through which screws or bolts are driven to secure the bearing-box to the cylinder. Thus these lugs take the supporting strain off from the fastening screws or bolts.

The outside gudgeons, Q Q, in which the bearing-boxes turn, are secured to the under side of the frame B, as indicated in Fig. 2, by screws or their equivalents. The under or middle gudgeons, M M, project from the opposite sides of a cross-bar, P, Fig. 3, which extends across the frame from front to rear between the rollers. It is made thin, and being vertically edgewise it occupies but little space, thereby enabling the rollers to be brought quite closely together, and being thus made thin, and yet edgewise, in order to secure it steadily in position, its ends are not only let into notches in the frame B, as shown in Fig. 1, but it has two single flanges, $p$ $p$, on the two ends respectively, one extending outward from one side and the other from the other side, substantially as shown in Fig. 3, so that by a single screw or bolt being driven through each flange into the frame, so as to hold with an extended leverage, the requisite strength and firmness of attachment to the frame is obtained by a very simple, light, and cheap construction.

The gudgeons M M have shoulders $l$ $l$, and the hub or eye of the bearing-boxes H H have enlargements L L, which extend over these shoulders, thereby excluding sand from the gudgeon.

The whole implement constructed with these improvements is simple, easily made, strong, convenient, well protected from the weather, not liable to get out of order, and runs very easily.

What I claim as my invention, and desire to secure by Letters Patent, is—

The gudgeon cross-bar P, when provided with the single attaching-flanges $p$ $p$, projecting in opposite directions, in combination with the shouldered gudgeons M M, and box-enlargement L L, extending over them in the manner and for the purpose herein set forth.

U. M. SUNDERLAND.

Witnesses:
H. CLAY STIER,
SAMUEL SPEARING.